(12) United States Patent
Parra Becerra et al.

(10) Patent No.: US 9,937,867 B2
(45) Date of Patent: Apr. 10, 2018

(54) DEPLOYABLE, EXPANDABLE STORAGE ASSEMBLY FOR A MOTOR VEHICLE

(71) Applicant: FORD GLOBAL TECHNOLOGIES, LLC, Dearborn, MI (US)

(72) Inventors: Santiago Manuel Parra Becerra, Ocoyoacac. Col. Juarez los Chirinos (MX); Maria Fernanda Villanueva Ochoa, Tlalnepantla (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/088,168

(22) Filed: Apr. 1, 2016

(65) Prior Publication Data

US 2017/0282810 A1    Oct. 5, 2017

(51) Int. Cl.
| | |
|---|---|
| *B60R 7/06* | (2006.01) |
| *B60R 7/04* | (2006.01) |
| *B65D 21/08* | (2006.01) |
| *B60R 7/00* | (2006.01) |
| *B60R 11/00* | (2006.01) |

(52) U.S. Cl.
CPC .............. *B60R 7/06* (2013.01); *B60R 7/005* (2013.01); *B60R 7/04* (2013.01); *B65D 21/086* (2013.01); *B60R 2011/0082* (2013.01)

(58) Field of Classification Search
CPC ........... B60R 7/005; B60R 7/04; B60R 7/046; B60R 7/06
USPC ................ 296/37.1, 37.5, 37.8, 37.13, 37.15
See application file for complete search history.

(56) References Cited

U.S. PATENT DOCUMENTS

| | | | | |
|---|---|---|---|---|
| 1,179,445 | A | * 4/1916 | Manning | ................ B60R 7/043 224/275 |
| 7,631,920 | B2 | 12/2009 | Norman et al. | |
| 9,211,848 | B2 | 12/2015 | Murray et al. | |

FOREIGN PATENT DOCUMENTS

| | | | | |
|---|---|---|---|---|
| DE | 19611892 C1 | * 9/1997 | ............. | B60N 2/464 |
| DE | 102006002809 A1 | 7/2007 | | |
| DE | 102006002829 A1 | 7/2007 | | |
| EP | 2048032 A1 | 4/2009 | | |
| GB | 381652 A | * 10/1932 | ............... | B60R 7/04 |
| JP | 2013233912 A | * 11/2013 | ............... | B60R 7/06 |
| KR | 19980036742 U | 9/1998 | | |
| WO | WO 0021793 A1 | * 4/2000 | ............... | B60R 7/04 |

OTHER PUBLICATIONS

English Machine Translation of DE102006002809A1.
English Machine Translation of DE102006002829A1.
English Machine Translation of KR19980036742U.

* cited by examiner

*Primary Examiner* — Jason S Daniels
(74) *Attorney, Agent, or Firm* — Vichit Chea; King & Schickli, PLLC (57) ABSTRACT

A deployable and expandable storage assembly is provided for a motor vehicle. That storage assembly includes a panel, an expandable linkage assembly and a cover. The cover is carried on the expandable linkage assembly and is displaceable between a stowed position toward the panel and a deployed position projecting from the panel so as to define a storage space and an access opening.

15 Claims, 11 Drawing Sheets

DEPLOYABLE, EXPANDABLE STORAGE ASSEMBLY FOR A MOTOR VEHICLE

TECHNICAL FIELD

This document relates generally to the motor vehicle equipment field and, more particularly, to a storage assembly that is both deployable and expandable and may be provided in the center console, the side panels or at other locations in the motor vehicle.

BACKGROUND

Motor vehicle owners have expressed a strong desire for their motor vehicles to be equipped with a storage assembly of relatively large volume that is capable of receiving and holding items of larger dimension such as purses, file folders or the like. Such a storage assembly must also be easily accessible. As a further benefit, it would be advantageous if such a storage assembly were deployable and as such aesthetically integrated into the interior of the motor vehicle when not in use.

This document relates to just such a storage assembly.

SUMMARY

In accordance with the purposes and benefits described herein, a storage assembly is provided for a motor vehicle. That storage assembly comprises a panel, an expandable linkage assembly and a cover carried on the expandable linkage assembly and displaceable between a stowed position toward the panel and a deployed position projecting from the panel so as to define a storage space with an access opening.

The expandable linkage assembly may include a first connecting rod. That first connecting rod may include a first elastomeric link having a first end and a second end and a second elastomeric link having a third end and fourth end. A first pivot pin pivotally connects the first end of the first elastomeric link to a body of the motor vehicle. A second pivot pin secures the second end of the first elastomeric link to the third end of the second elastomeric link. A third pivot pin pivotally connects the fourth end of the second elastomeric link to the cover. For purposes of this document the term "body" refers to the panel, the support frame for the panel or other structure of the motor vehicle supporting or behind that panel.

The expandable linkage assembly may also include a second connecting rod having a third elastomeric link and a fourth elastomeric link. The third elastomeric link has a fifth end and a sixth end while the fourth elastomeric link has a seventh end and an eighth end. A fourth pivot pin pivotally connects the fifth end of the third elastomeric link to the body. A fifth pivot pin pivotally connects the sixth end of the third elastomeric link to the seventh end of the fourth elastomeric link. A sixth pivot pin connects the eighth end of the fourth elastomeric link to the cover. As should be appreciated, both connecting rods incorporate elastomeric links which may stretch so that the storage assembly may be expanded to receive larger volume items.

The storage assembly may further include a floor linkage. That floor linkage may include (a) a floor panel pivotally connected to the body by a pivot, (b) two opposed racks carried on the cover and (c) two opposed pinions carried on the floor panel that engage and travel along the two opposed racks as the floor panel is displaced between a first position against the cover when the cover is in the stowed position and a second position extending outwardly between the panel and the cover when the cover is in the deployed position. In addition, the storage assembly may include a biasing mechanism for biasing the floor linkage into the second position. That biasing mechanism may comprise one or more torsion springs at the pivot.

Still further, the storage assembly may include a first elastic mesh extending between the first connecting rod and the second connecting rod. In addition, the storage assembly may include a third connecting rod opposite the first connecting rod and a fourth connecting rod opposite the second connecting rod. A second elastic mesh may extend between the third connecting rod and the fourth connecting rod. Thus, the first elastic mesh forms a first end wall of the storage space while the second elastic mesh forms a second end wall of the storage space when the cover is in the deployed position.

The access opening is defined between the panel, the cover, the first elastic mesh and the second elastic mesh and the storage space is defined between the panel, the cover, the first elastic mesh, the second elastic mesh and the floor panel when the cover is in the deployed position.

Still further, the storage assembly may include a locking mechanism to secure the cover in the stowed position when the access opening and the storage space are closed. In one possible embodiment, the panel is a sidewall of a center console of the motor vehicle.

In the following description, there are shown and described several preferred embodiments of the deployable and expandable storage assembly. As it should be realized, the storage assembly is capable of other, different embodiments and its several details are capable of modification in various, obvious aspects all without departing from the storage assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the deployable and expandable storage assembly and together with the description serve to explain certain principles thereof. In the drawing figures:

FIGS. 2a-2c are detailed schematic illustrations showing the operation of the expandable linkage assembly. In FIG. 2a, the expandable linkage assembly is illustrated with the cover in the stowed or closed position. In FIG. 2b the expandable linkage assembly is illustrated with the cover in the deployed position. FIG. 2c illustrates the expandable linkage assembly when the cover is in the fully expanded position.

FIGS. 4a and 4b are detailed schematic illustrations of the floor linkage for the storage assembly. In FIG. 4a, the floor linkage is shown in the stowed position. In FIG. 4b, the floor linkage is shown in the deployed position.

Reference will now be made in detail to the present preferred embodiments of the deployable and expandable storage assembly, examples of which are illustrated in the accompanying drawing figures.

DETAILED DESCRIPTION

Figure 1:
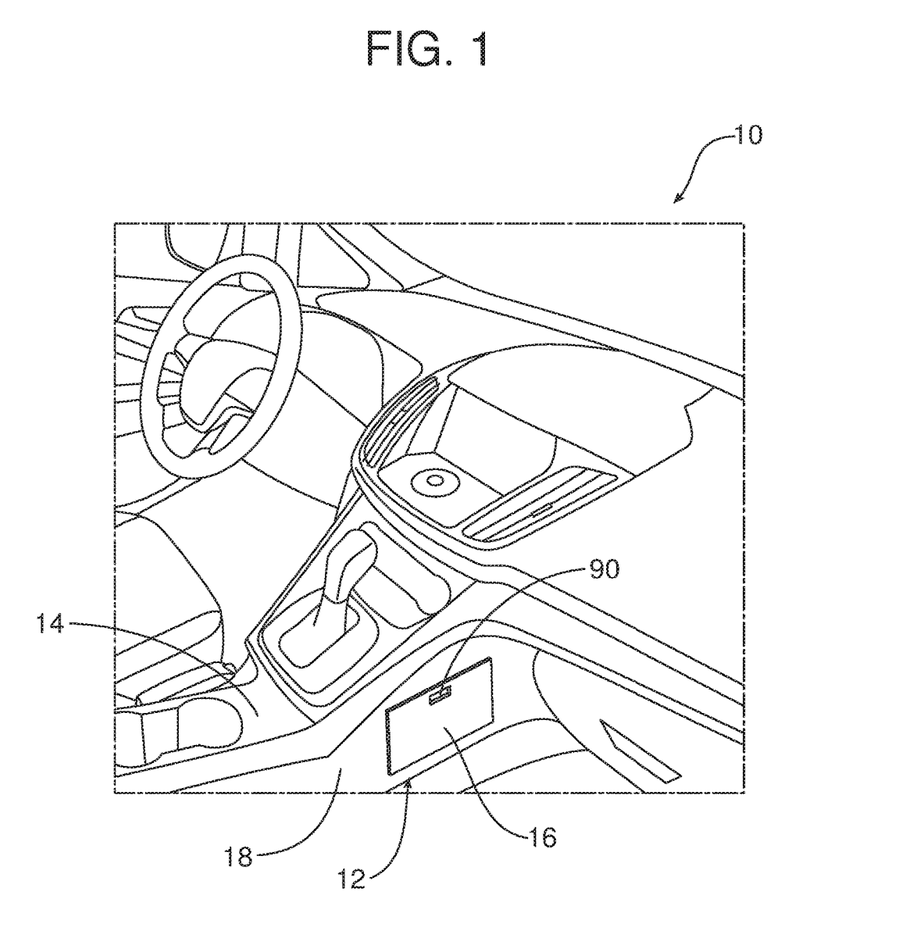
FIG. 1 is a perspective view illustrating the interior of a motor vehicle equipped with the deployable and expandable storage assembly which is shown in the stowed or closed position.

Reference is now made to FIG. 1 illustrating the interior of a motor vehicle 10 that incorporates the deployable and expandable storage assembly 12. As illustrated in FIG. 1, that storage assembly 12 is provided in the center console 14 of the motor vehicle 10. When the cover 16 of the storage assembly 12 is in the stowed or closed position, the cover 16 fits flush with the sidewall panel 18 of the center console 14 where it is integrated into the center console and provides an aesthetically pleasing appearance.

As schematically illustrated in FIGS. 2a-2c and 3a-3c, the storage assembly 12 incorporates an expandable linkage assembly generally designated by reference numeral 20. The cover 16 is carried on the expandable linkage assembly 20 and is displaceable between a stowed position, schematically illustrated in FIG. 2a wherein the cover 16 is toward or against the panel 18 and a deployed position, schematically illustrated in FIG. 2b wherein the cover projects from the panel so as to define a storage space 22 with an access opening 24. As will be further apparent from the following description, the cover 16 may also be displaced into an expanded position, illustrated in FIG. 2c to maximize the volume of the storage space 22 and the size of the access opening 24 so as to allow the storage assembly 12 to receive and hold larger items.

Figure 2A:
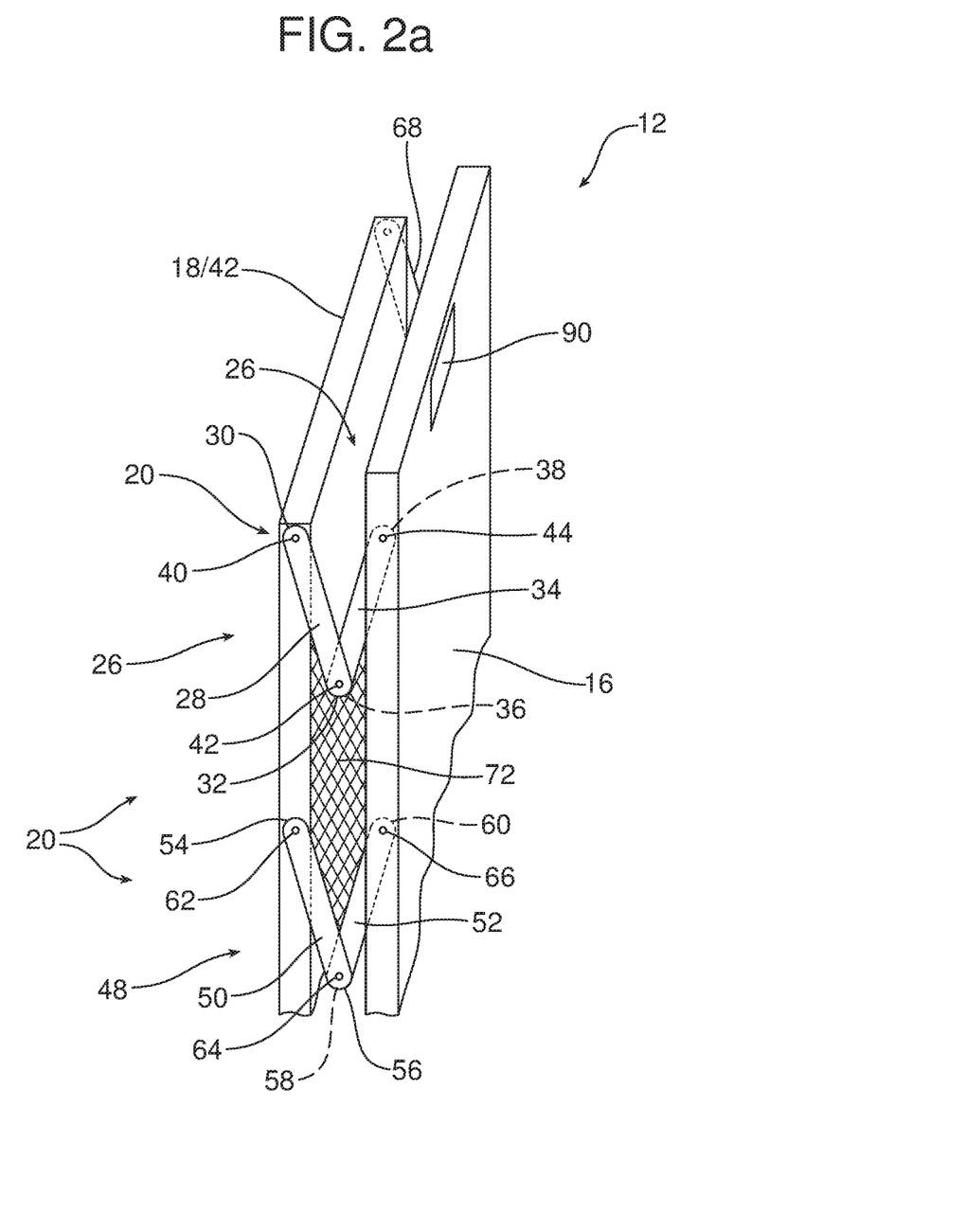
Figure 2B:
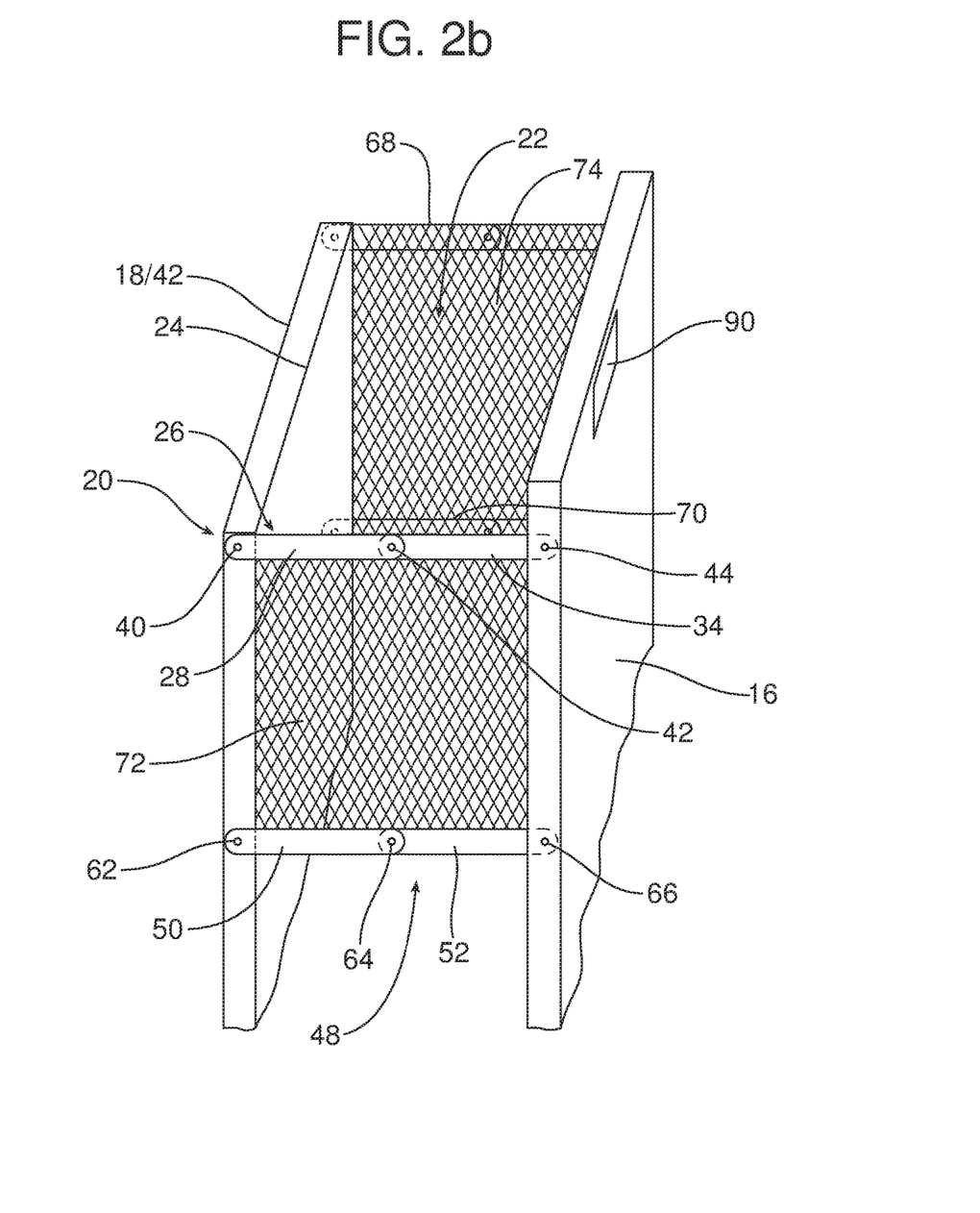
Figure 2C:
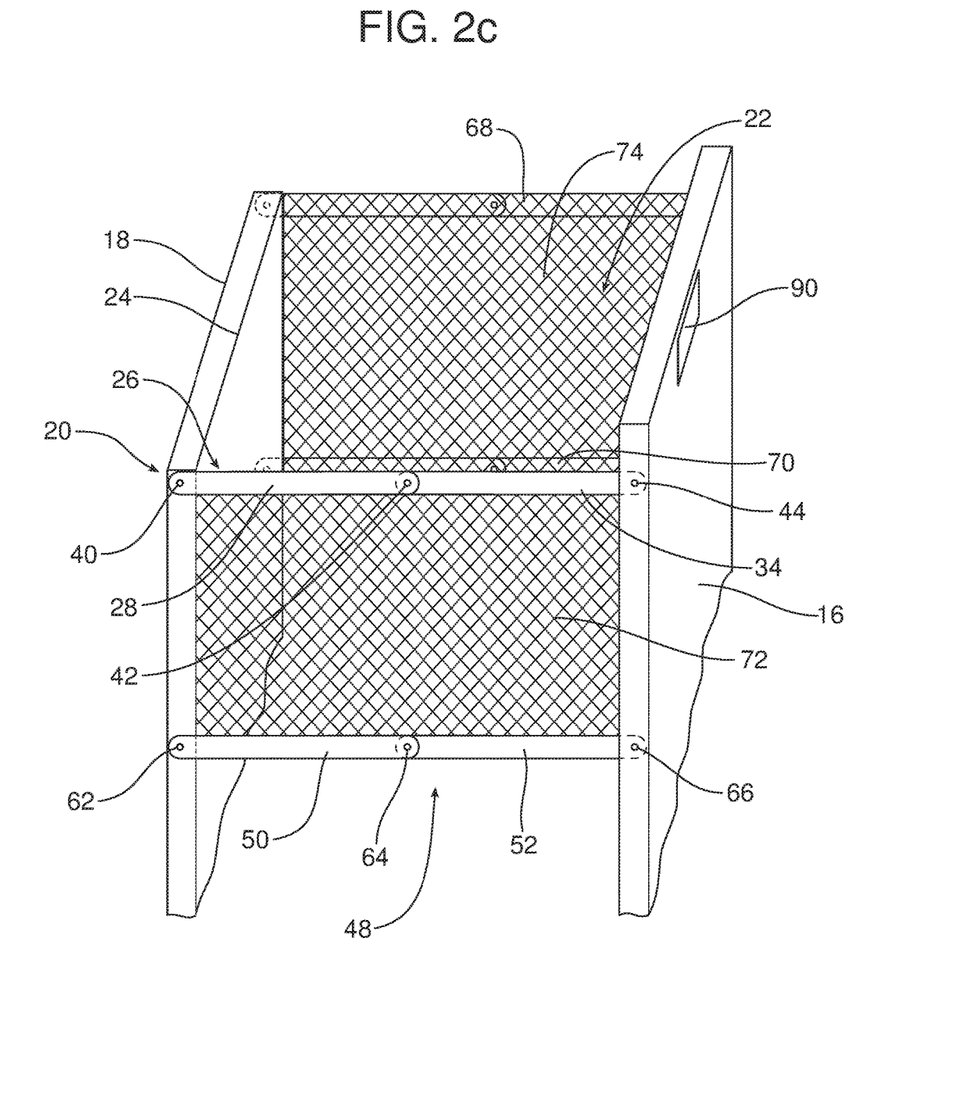

As illustrated in FIGS. 2a-2c, the expandable linkage assembly 20 includes a first connecting rod 26. As illustrated in detail in FIGS. 3a-3c, the first connecting rod 26 includes a first elastomeric link 28 having a first end 30 and a second end 32 and a second elastomeric link 34 having a third end 36 and a fourth end 38. A first pivot pin 40 pivotally connects the first end 30 of the first elastomeric link 28 to the body 42 of the motor vehicle. In the illustrated embodiment the body 42 comprises a support frame.

Figure 3A:
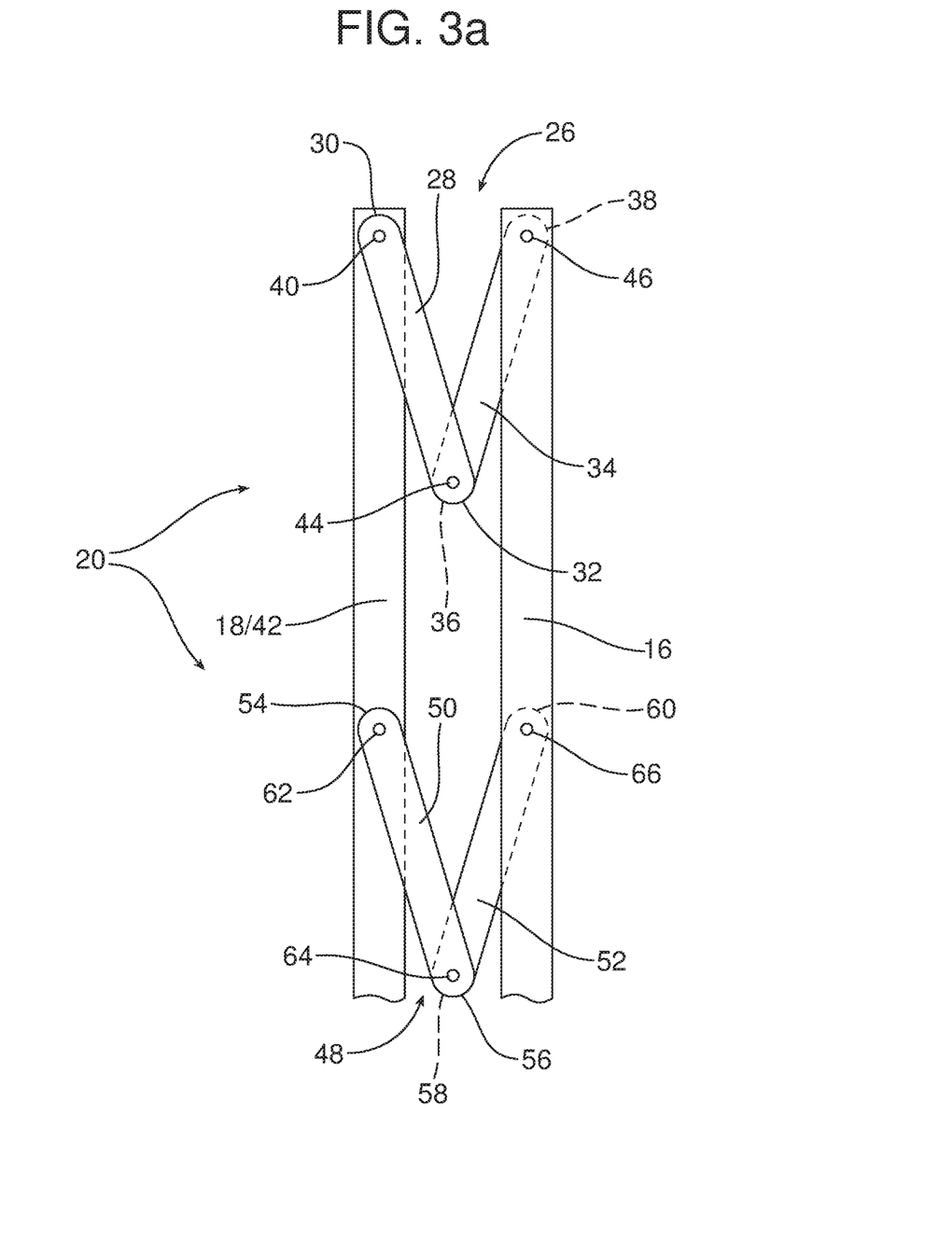
FIGS. 3a-3c are detailed schematic views illustrating the expandable linkage assembly and, more particularly, the connecting rods which include elastomeric links that may be stretched to expand the storage assembly.
Figure 3B:
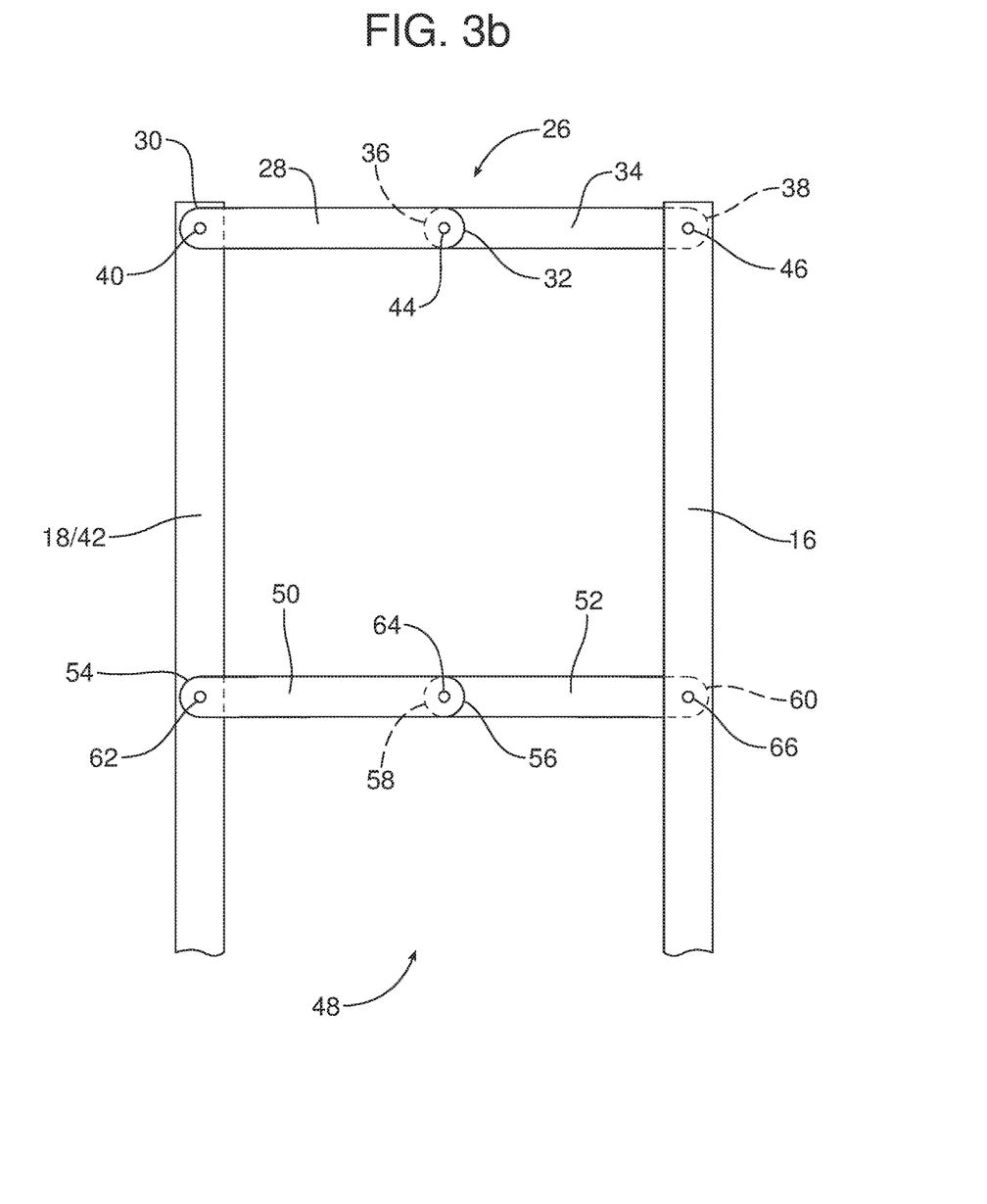
Figure 3C:
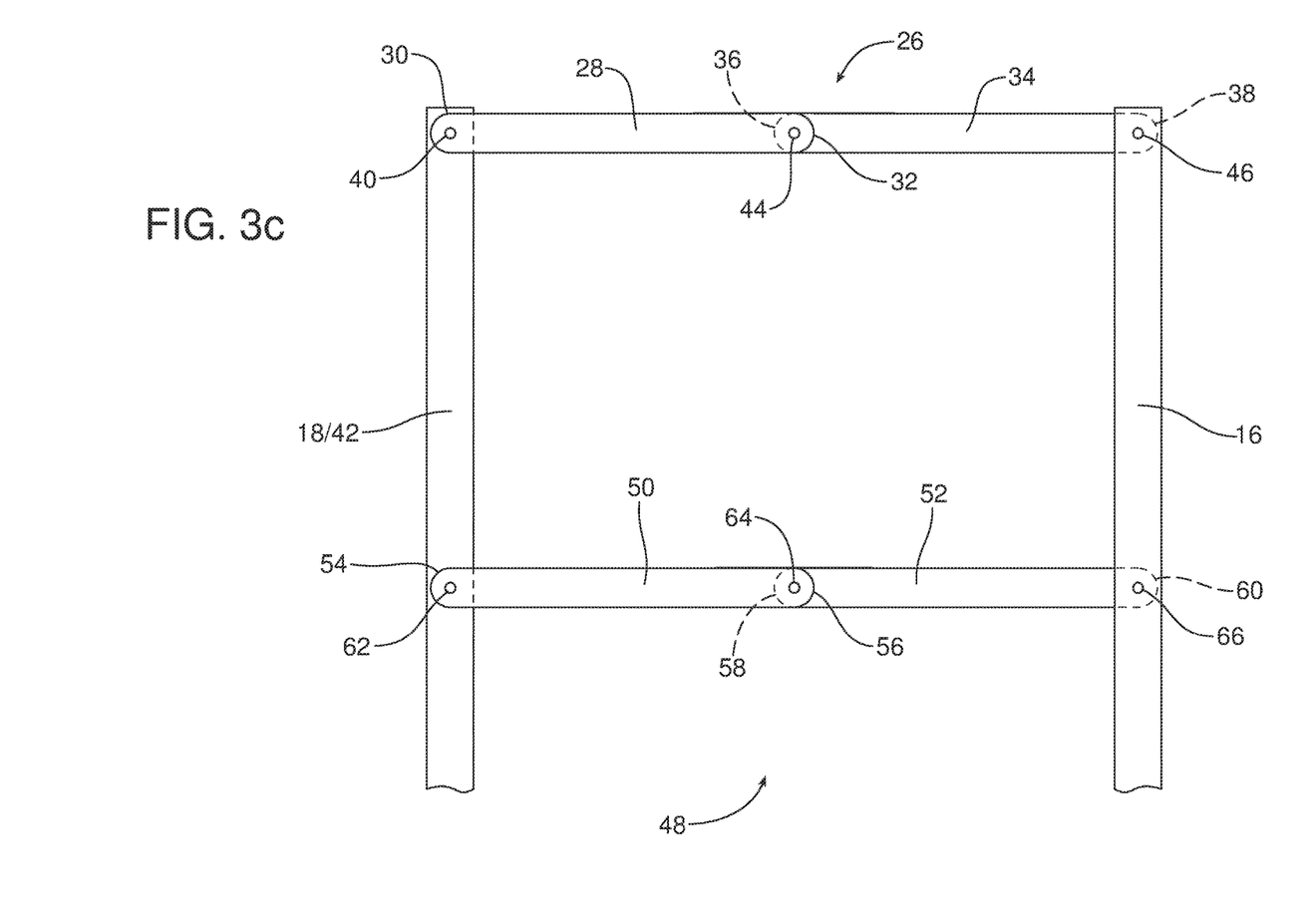

A second pivot pin 44 pivotally connects the second end 32 of the first elastomeric link 28 to the third end of 36 of the second elastomeric link 34. A third pivot pin 46 pivotally connects the fourth end 38 of the second elastomeric link to the cover 16.

As further illustrated in FIGS. 2a-2c, the expandable linkage assembly 20 further includes a second connecting rod 48 having a third elastomeric link 50 and a fourth elastomeric link 52. The third elastomeric link 50 has a fifth end 54 and a sixth end 56 while the fourth elastomeric link 52 has a seventh end 58 and an eighth end 60. A fourth pivot pin 62 pivotally connects the fifth end 54 of the third elastomeric link 50 to the body/support frame 18/42. A fifth pivot pin 64 pivotally connects the sixth end of the third elastomeric link 50 with the seventh end 58 of the fourth elastomeric link 52. A sixth pivot pin 66 pivotally connects the eighth end 60 of the fourth elastomeric link 52 with the cover 16.

As illustrated in FIGS. 3a and 3b, when the storage assembly 12 is in the stowed position and the deployed position, the elastomeric or resilient links 28, 34 are of normal or static length. In contrast, as illustrated in FIG. 3c, when the storage assembly 12 is expanded to increase the size of the access opening 24 and the volume of the storage space 22, the first and second elastomeric/resilient links 28, 34 stretch so as to be longer in length. While not illustrated in detail in FIGS. 3a-3c, the third and fourth elastomeric links 50, 52 of the second connecting rod 48 function in the same manner. Since the links 28, 34, 50 and 52 are made from an elastomeric or resilient material with shape memory, they all return to their original length when any larger volume items are removed from the expandable storage assembly 12.

As should be further appreciated from viewing FIGS. 2a-2c, the storage assembly 12 also includes a third connecting rod 68 opposite the first connecting rod 26 and fourth connecting rod 70 opposite the second connecting rod 48. The third and fourth connecting rods 68, 70 are substantially mirror image structures of the first and second connecting rods 26, 48.

As illustrated in FIGS. 2a-2c, a first elastomeric mesh 72 extends between the first connecting rod 26 and the second connecting rod 48. A second elastomeric mesh 74 extends between the third connecting rod 68 and the fourth connecting rod 70 at the other end of the cover 1. When the cover is in the deployed position or the expanded position illustrated in FIGS. 2b and 2c, the first and second elastomeric meshes 72, 74 stretch or contract with the connecting rods 26, 48, 68 and 70 to form opposed end walls of the storage assembly 12 and storage space 22 defined therebetween.

Figure 4A:
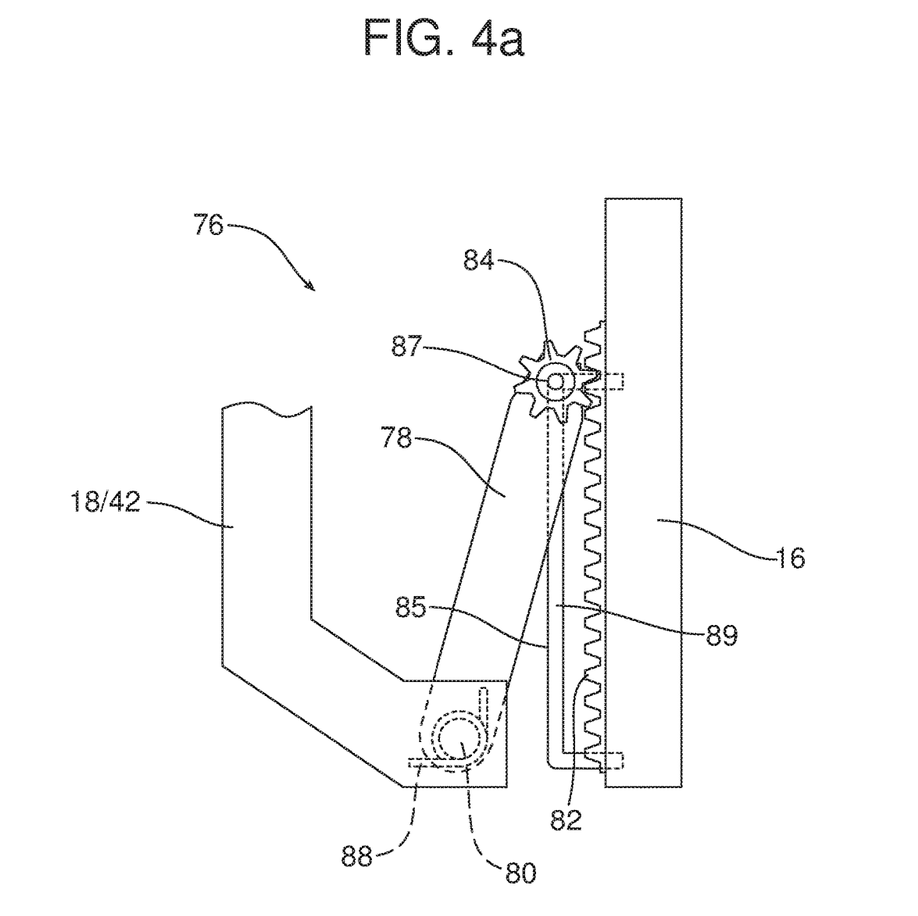
Figure 4B:
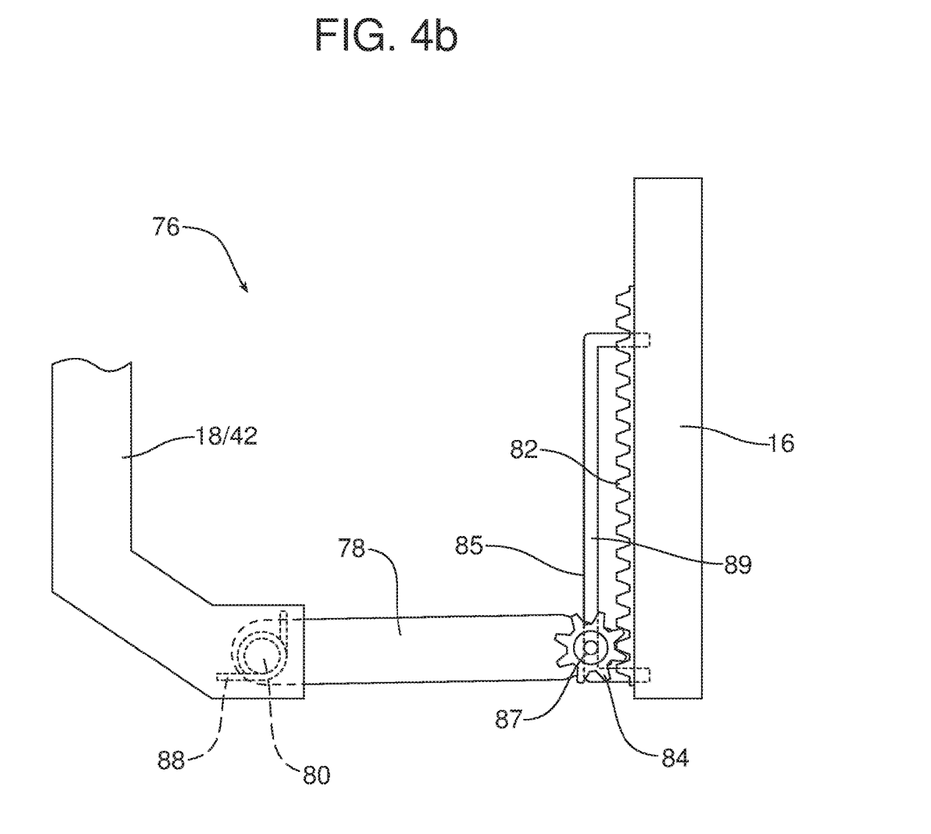

Reference is now made to FIGS. 4a and 4b schematically illustrating a floor linkage 76 of the storage assembly 12. The floor linkage 76 includes a floor panel 78 that is pivotally connected to the body/support frame 18/42 by a pivot or hinge 80, two opposed racks 82 at each end of the cover 16 (only one visible in the drawing figures), two opposed pinions 84 carried on the floor panel at each end thereof (again one visible in the drawing figure) and two opposed pinion guide rails 85 (only one visible in the drawing figures) for guiding the pinions along the rails. More specifically, the pinion shaft 87 rides in a channel 89 formed in the guide rail 85. As illustrated, the pinions 84 engage with teeth of the racks 82 so as to travel along the two opposed racks as the floor panel 78 is displaced between a first or stowed position, relatively upright against the cover 16 (see FIG. 4a) and a second, deployed position extending outwardly between the body/support frame 18/42 and the cover 16 when the cover is in the deployed position (see FIG. 4b). A biasing mechanism 88, in the form of a torsion spring, at the pivotal hinge 80 functions to bias the floor linkage 76 into the second or deployed position illustrated in FIG. 4b. In such a position, the floor panel 78 extends between the body/support frame 18/42 on one side and the deployed cover 16 on the other so as to form a continuous floor for the storage space of the storage assembly 12.

Figure 5A:
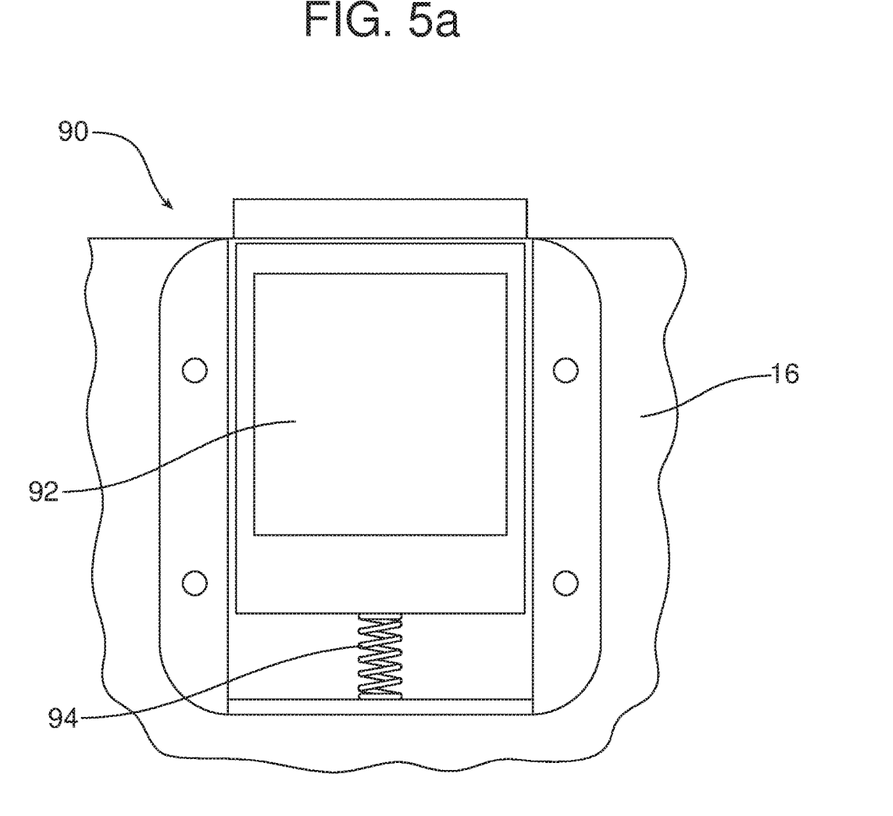
FIGS. 5a-5c are a series of views illustrating the locking mechanism that secures the cover in the closed position.
Figure 5B:
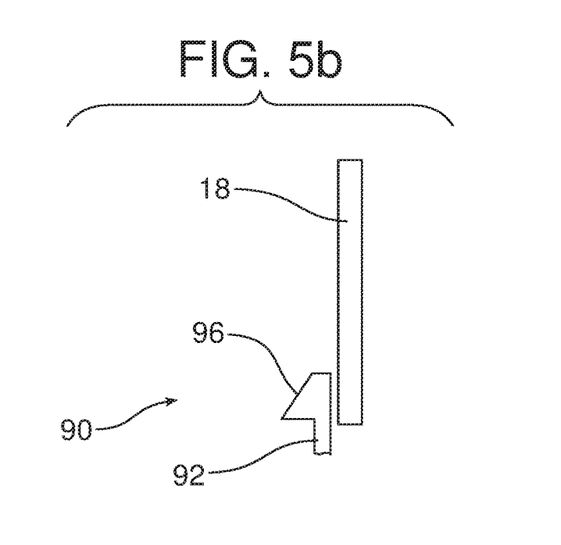
Figure 5C:
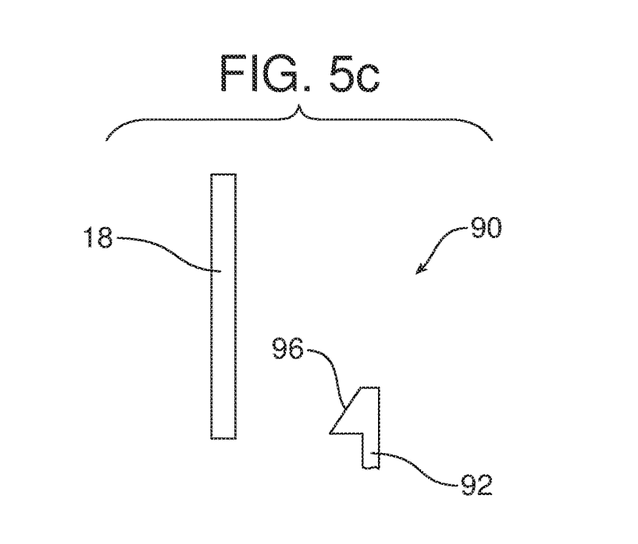

When a motor vehicle operator enters the motor vehicle 10, the operator may engage the locking mechanism 90 on the cover 16 to release the locking mechanism and allow the torsion spring 88 to bias the cover 16 from the stowed position illustrated in FIGS. 1 and 2a to the deployed position illustrated in FIG. 2b. The driver may then place an item such as a purse into the storage space 22 through the access opening 24. Here it should be appreciated that the cover 16 may be further displaced to the expanded position illustrated in FIG. 2c in order to accept an item or purse of larger dimension. As illustrated in FIGS. 5a-5c, the locking mechanism 90 may comprise a sliding actuator 92 carried on the cover and biased by a spring 94 into a locking position illustrated in FIG. 5b wherein the actuator snaps behind a margin of the body 18. The cam surface 96 on the actuator 92 engages the body 18 as the cover 16 is closed allowing the actuator to move past the margin of the body 18 before returning under the biasing force of the spring 94 into the locked positions. As illustrated in FIGS. 5a and 5c one need only push the actuator 92 downward in the direction of action arrow A so as to allow the actuator to move past the margin of the body 18 and open the cover 16.

During operation of the motor vehicle, the purse is held securely in the storage space 22 of the storage assembly 12. Upon reaching a desired destination, the user may withdraw the purse or item from the storage space 22 and then push the cover 16 against the force of the biasing mechanism 88 back into the closed position where it is latched in place by the locking mechanism 90. As previously noted, in this stowed or closed position, the cover 16 may be designed to fit flush with the sidewall panel 18 effectively concealing the storage space 22 and access opening 24 and providing clean aesthetically pleasing lines along the side of the center console 14.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A storage assembly for a motor vehicle, comprising:
a panel;
an expandable linkage assembly including (a) a first connecting rod having a first elastomeric link having a first end and a second end and a second elastomeric link having a third end and a fourth end wherein a first pivot pin at said first end connects said first elastomeric link to a body of said motor vehicle, a second pivot pin at said second end and said third end connects said first elastomeric link to said second elastomeric link and a third pivot pin at said fourth end connects said second elastomeric link to said cover and (b) a second connecting rod having a third elastomeric link and a fourth elastomeric link wherein third elastomeric link has a fifth end and a sixth end and said fourth elastomeric link has a seventh end and an eighth end wherein a fourth pivot pin at said fifth end connects said elastomeric link to said body, a fifth pivot pin at said sixth end and said seventh end connects said third elastomeric link to said fourth elastomeric link and said sixth pivot pin connects said fourth elastomeric link to said cover;
a cover carried on said expandable linkage assembly and displaceable between a stowed position toward said panel and a deployed position projecting from said panel in a parallel arrangement so as to define a storage space with an access opening; and
a floor linkage including (a) a floor panel pivotally connected to said body by a pivot, (b) two opposed racks carried on said cover and (c) two opposed pinions carried on said floor panel that engage with and travel along said two opposed racks as said floor panel is displaced between a first position against said cover when said cover is in said stowed position and a second position extending outwardly between said panel and said cover when said cover is in said deployed position.

2. The storage assembly of claim 1, further including a biasing mechanism biasing said floor linkage into said second position.

3. The storage assembly of claim 2, wherein said biasing mechanism comprises a torsion spring at said pivot.

4. The storage assembly of claim 2, further including a first elastic mesh extending between said first connecting rod and said second connecting rod.

5. The storage assembly of claim 4, further including a third connecting rod opposite said first connecting rod and a fourth connecting rod opposite said second connecting rod.

6. The storage assembly of claim 5, further including a second elastic mesh extending between said third connecting rod and said fourth connecting rod wherein said first elastic mesh forms a first end wall of said storage space and said second elastic mesh forms a second end wall of said storage space when said cover is in said deployed position.

7. The storage assembly of claim 6, wherein (a) said access opening is defined between said panel, said cover, said first elastic mesh and said second elastic mesh and (b) said storage space is defined between said panel, said cover, said first elastic mesh, said second elastic mesh and said floor panel when said cover is in said deployed position.

8. The storage assembly of claim 7, further including a locking mechanism to secure said cover in said stowed position when said access opening and said storage space are closed.

9. The storage assembly of claim 8, wherein said panel is a sidewall of a center console of said motor vehicle.

10. A storage assembly for a motor vehicle, comprising:
a panel;
an expandable linkage assembly;
a cover carried on said expandable linkage assembly and displaceable between a stowed position toward said panel and a deployed position projecting from said panel so as to define a storage space with an access opening; and
a floor linkage including (a) a floor panel pivotally connected to a body of said motor vehicle by a pivot, (b) two opposed racks carried on said cover and (c) two opposed pinions carried on said floor panel that engage with and travel along said two opposed racks as said floor panel is displaced between a first position against said cover when said cover is in said stowed position and a second position extending outwardly between said panel and said cover where said cover is in said deployed position.

11. The storage assembly of claim 10, further including a biasing mechanism biasing said floor linkage into said second position.

12. The storage assembly of claim 11, wherein said biasing mechanism comprises a torsion spring at said pivot.

13. A storage assembly for a motor vehicle, comprising:
a panel;
an expandable linkage assembly; and
a cover carried on said expandable linkage assembly and displaceable between a stowed position toward said panel and a deployed position projecting from said panel so as to define a storage space with an access opening,
wherein said expandable linkage assembly includes a first connecting rod, a second connecting rod and a first elastic mesh extending between said first connecting rod and said second connecting rod forming a first end of said storage space.

14. The storage assembly of claim 13, wherein said expandable linkage assembly includes a third connecting rod, a fourth connecting rod and a second elastic mesh extending between said third connecting rod and said fourth connecting rod forming a second end of said storage space.

15. The storage assembly of claim 14, including a floor panel pivotally connected to a body of said motor vehicle by a pivot forming a floor of said storage space between said first end and said second end.

* * * * *